United States Patent [19]
Kahn

[11] Patent Number: 5,326,855
[45] Date of Patent: Jul. 5, 1994

[54] PROCESS FOR THE MANUFACTURE OF ELASTOMERS IN PARTICULATE FORM

[76] Inventor: Henry Kahn, 5603 Rutherglen, Houston, Tex. 77096

[21] Appl. No.: 50,736

[22] Filed: May 15, 1987

Related U.S. Application Data

[63] Continuation of Ser. No. 737,808, May 23, 1985, abandoned, which is a continuation of Ser. No. 539,577, Oct. 6, 1983, abandoned.

[51] Int. Cl.$^5$ .................................................. C08F 6/24
[52] U.S. Cl. ................................... 528/498; 528/491; 528/501; 526/62; 526/77; 264/344; 264/345; 159/DIG. 10
[58] Field of Search ................... 526/77, 282, 339, 62; 528/501, 498, 491; 159/DIG. 10, 3; 34/9; 264/344, 345

[56] References Cited

U.S. PATENT DOCUMENTS

| | | | |
|---|---|---|---|
| 3,428,619 | 2/1969 | Hawkins et al. | 528/501 |
| 3,476,729 | 11/1969 | Smith et al. | 528/498 X |
| 3,799,235 | 3/1974 | Moosavian et al. | 159/3 |
| 4,098,980 | 7/1978 | Markle et al. | 526/201 |

OTHER PUBLICATIONS

Seymour et al., Polymer Chemistry (2nd ed.), Marcel Dekker, Inc., N.Y., 159-160, 1988.

*Primary Examiner*—Fred Teskin
*Attorney, Agent, or Firm*—John R. Casperson

[57] ABSTRACT

A process and plant are disclosed for the manufacture of particulate or liquid elastomeric polymers suitable for the manufacture of a wide variety of commercial elastomers, substantially in the absence of water for purifying and particulating the elastomer.

12 Claims, 3 Drawing Sheets

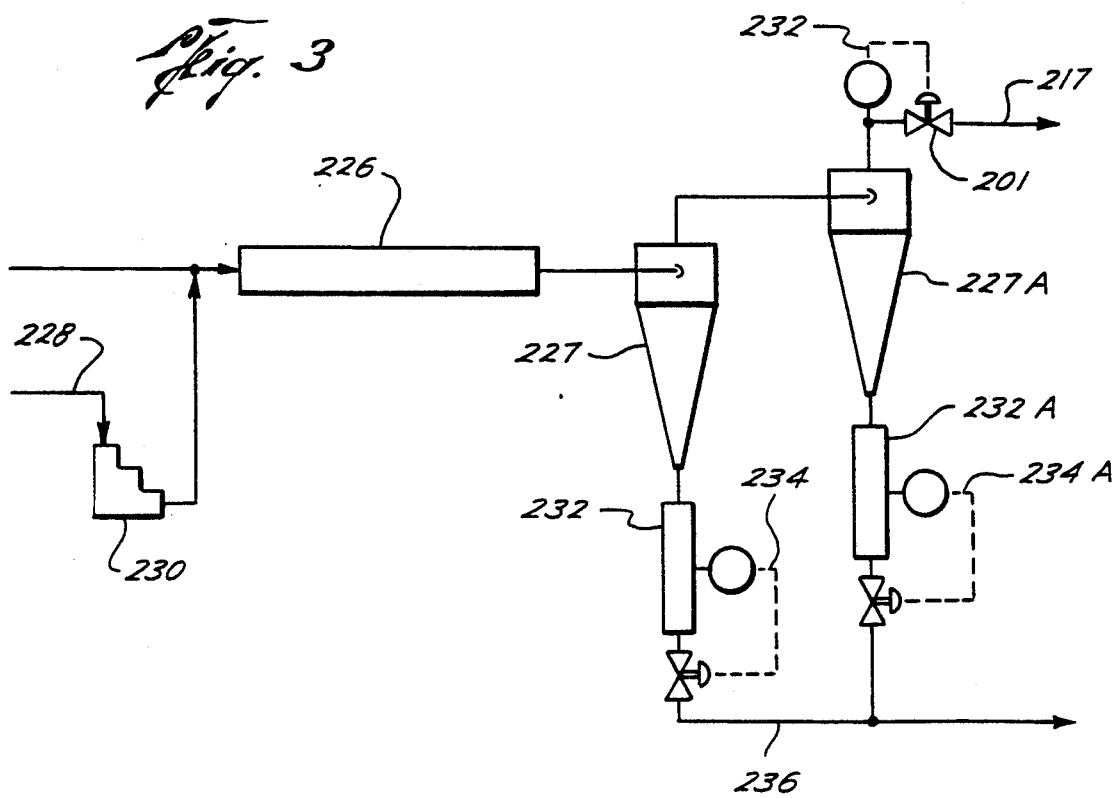
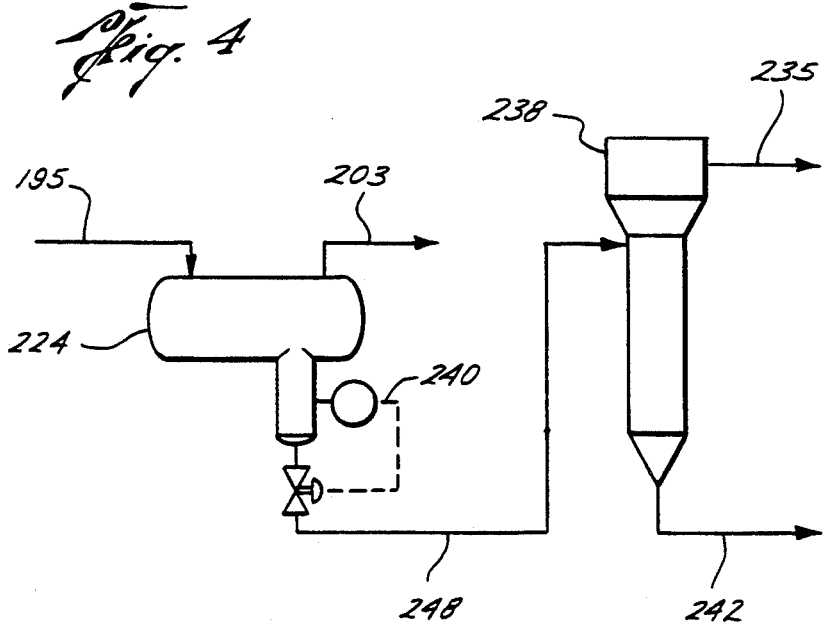

PROCESS FOR THE MANUFACTURE OF ELASTOMERS IN PARTICULATE FORM

This is a continuation of application Ser. No. 737,808, filed May 23, 1985, now abandoned, which is a continuation of application Ser. No. 539,577, filed Oct. 6, 1983 now abandoned.

BACKGROUND OF THE INVENTION

1. Field of the Invention

The present invention relates to a process for manufacturing many of the common commercial elastomers. The elastomers that can be manufactured by this process include, but are not limited to, ethylene-propylene-diene rubber, styrene-butadiene rubber, styrene-butadiene thermoplastic rubber, cis-polybutadiene rubber, butyl rubber and cis-polyisoprene rubber. The process applies to both batch and continuous manufacturing processes. Further, the process is used with elastomers produced in solution or in particulate form. A modification of the process makes it applicable for the manufacture very low molecular weight liquid polymers.

2. Description of the Prior Art

The manufacture of elastomers in anhydrous solvents or diluents consists of a polymerization section, a catalyst removal section, an elastomer particulation section, a diluent and monomer recycle purification section and an elastomer packaging and shipping section. See, for example for unrelated types of processes, U.S. Pat. No. 3,523,929, entitled "Olefin Polymerization Process", issued Aug. 11, 1970, to J. L. Paige et al; U.S. Pat. No. 2,565,960, entitled "Preparation of an Improved Hydrocarbon Resin", issued Aug. 28, 1951, to J. D. Garber et al; U.S. Pat. No. 4,068,053, entitled "Method of Removing Water From Liquid Olefin In The Polymerization of Olefins", issued Jan. 10, 1978, to C. D. Miserlis et al.

Existing elastomer processes do not normally use fine molecular sieve removal steps prior to the reactor in the polymerization section, although the use of molecular sieves is known in the art. Various purification steps for other processes unrelated to the elastomer process of this invention are shown in the prior art. See, for example, U.S. Pat. No. 2,900,430, entitled "Process For the Removal of straight Chain Acetylene From Isoprene", issued Aug. 18, 1959, to A. M. Henke et al; U.S. Pat. No. 2,906,795, entitled "Recovery and Utilization of Normally Gaseous Olefins", issued Sep. 29, 1959, to W. P. Bullard et al; U.S. Pat. No. 3,209,050, entitled "Purification of Diolefins", issued Sep. 28, 1965, to E. S. Hanson; U.S. Pat. No. 3,326,999, entitled "Purification of Olefins", issued Jun. 20, 1967, to R. D. Rhodes, Jr.; U.S. Pat. No. 3,352,840, entitled "Removal of Deposits From Polymerization Reactors", issued Nov. 14, 1967, to C. M. Oktay; U.S. Pat. No. 3,514,426, entitled "Process For Suppressing Molecular Jump", issued May 26, 1970, to R. E. Barrett; U.S. Pat. No. 3,635,931, entitled "Polyisoprene From Amylenes Via-Amylene Isomerization Oxidative Dehydrogeneration Extractive Distillation and Polymerization of Low-Concentration Isoprene", issued Jan. 18, 1972, to J. W. Davison; U.S. Pat. No. 4,016,349, entitled "Process For Removing Vanadium Residues From Polymer Solutions", issued Apr. 5, 1977, to J. M. McKenna; U.S. Pat. No. 4,182,801, entitled "Method of Drying Liquid Olefin Monomer Feed in a Molecular Sieve Dryer in the Polymerization of Olefins From Liquid Olefin Monomer", issued Jan. 8, 1980, to Miserlis et al; U.S. Pat. No. 4,235,983, entitled "Purification of Olefin Recycle to Polymerization", issued Nov. 25, 1980, to Steigelmann et al; and Paige.

Existing processes utilize an expensive hot water injection particulation section which also increases the cost of diluent and monomer recycle purification and adds a water waste disposal problem.

The use of flashing or settling zones for recovery of materials in processes unrelated to the elastomer process of this invention is also known in the prior art. See, for example, U.S. Pat. No. 2,921,053, entitled "Recovery of Olefins From Hydrocarbon Mixtures", issued Jan. 12, 1960, to R. F. Dye; and McKenna.

Further, some patents show the use of additives for product separation. See, for example, U.S. Pat. No. 4,098,980 to Markle et al. As set out infra, the reactants and other materials are carefully specified, and no additional additives, or place from which they could be introduced, are shown in the specification, and the process operates as shown and without any such additives.

SUMMARY OF THE PRESENT INVENTION

The present invention eliminates several costly portions of the rubber processes of the prior art. The process of the present invention may involve passing the reactants through fine molecular sieves to remove impurities prior to the reaction stage and then reacting same.

After the reaction stage and prior to separating the elastomer and diluent or solvent, it is necessary to reduce catalyst and monomer concentration in the reactor effluent. With a slurry system, this is accomplished as part of this invention by flowing the reactor effluent to near the middle of a column and flowing fresh diluent from the bottom of the column. The particles are allowed to settle in the fresh diluent and discharge with the fresh diluent to the flash separation units discussed supra. The liquid from the reactor effluent flows out of the top of the column.

The present invention also eliminates the costly water injection particulation step and disengages the solvent or diluent directly from dissolved as particulate elastomer by flashing the solvent or diluent as vapor and separating particulate elastomer in a flash drum or cyclone.

The elastomer is then finish dried in a fluid bed dryer, packaged and shipped.

The vapor is compressed, condensed to liquid, purified as needed and recycled.

Alternately, in the case of an elastomer in solution, catalyst reduction is accomplished by contacting the solution with catalyst complexing agents which form a high density insoluble complexes that are separated by decantation or centrifugation. The clarified solution is then separated into particulate elastomer and solvent vapor by flashing in a heated pipe and separated in a flash tank or cyclone as above.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 3 is a schematic of an alternate configuration of the preferred embodiment of the present invention showing the process operating on an elastomer in solution with a catalyst removal from solution step; and FIG. 4 is a schematic of an alternate configuration of the preferred embodiment of the present invention for liquid elastomer showing the process decanting of liquid elastomer from diluent and catalyst, then stripping the remaining solvent or diluent from the liquid elastomers.

DESCRIPTION OF THE PREFERRED EMBODIMENT

Figure 1:
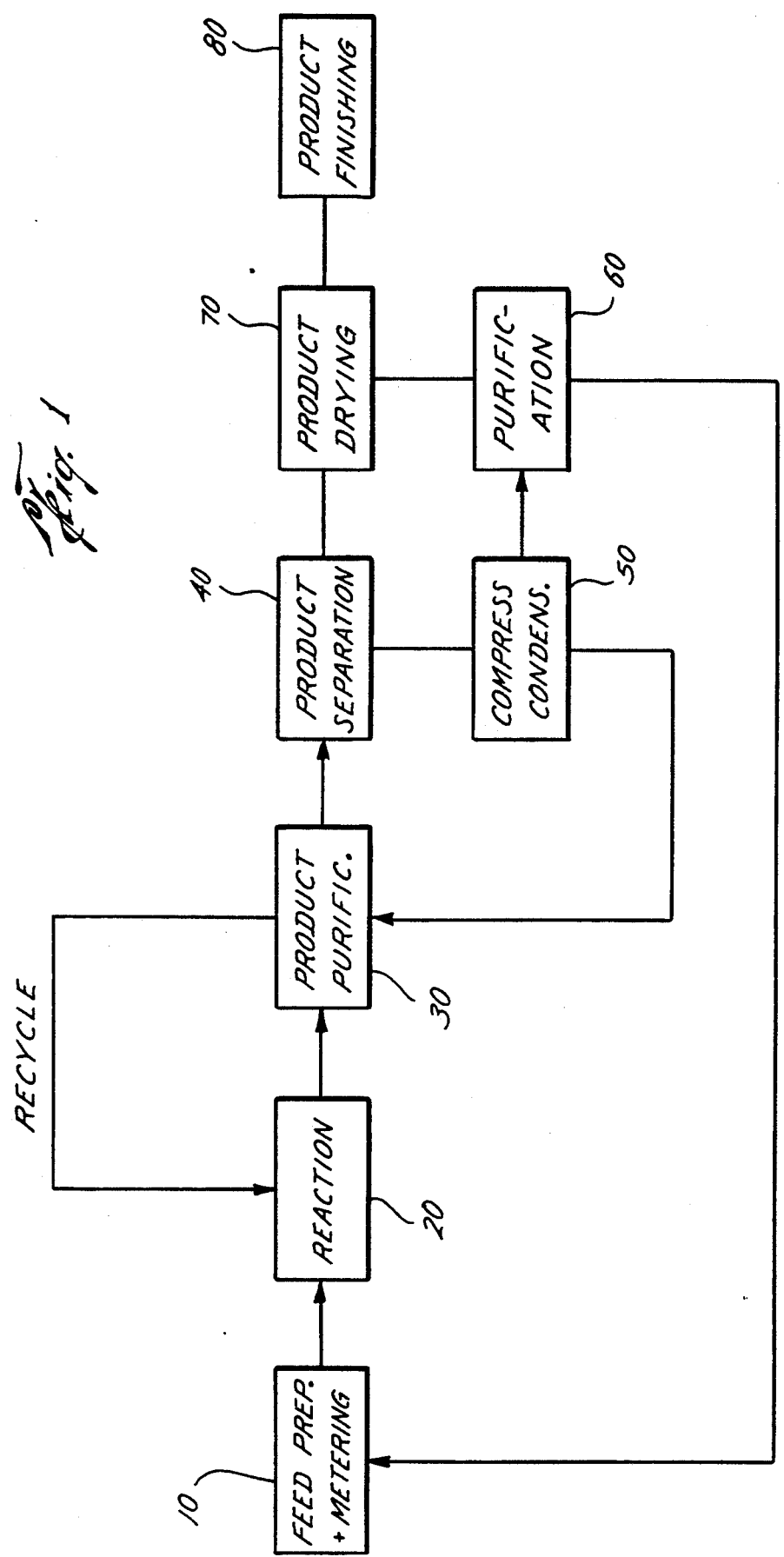
FIG. 1 is a functional block diagram of the elastomer process of the preferred embodiment of the present invention.

As shown in FIG. 1, the process of the present invention includes eight major steps, feed preparation and metering 10, reaction 20, product purification 30, product separation 40, compression 50, diluent purification 60, product drying 70, and product finishing 80.

Feed Preparation and Metering

Figure 2:
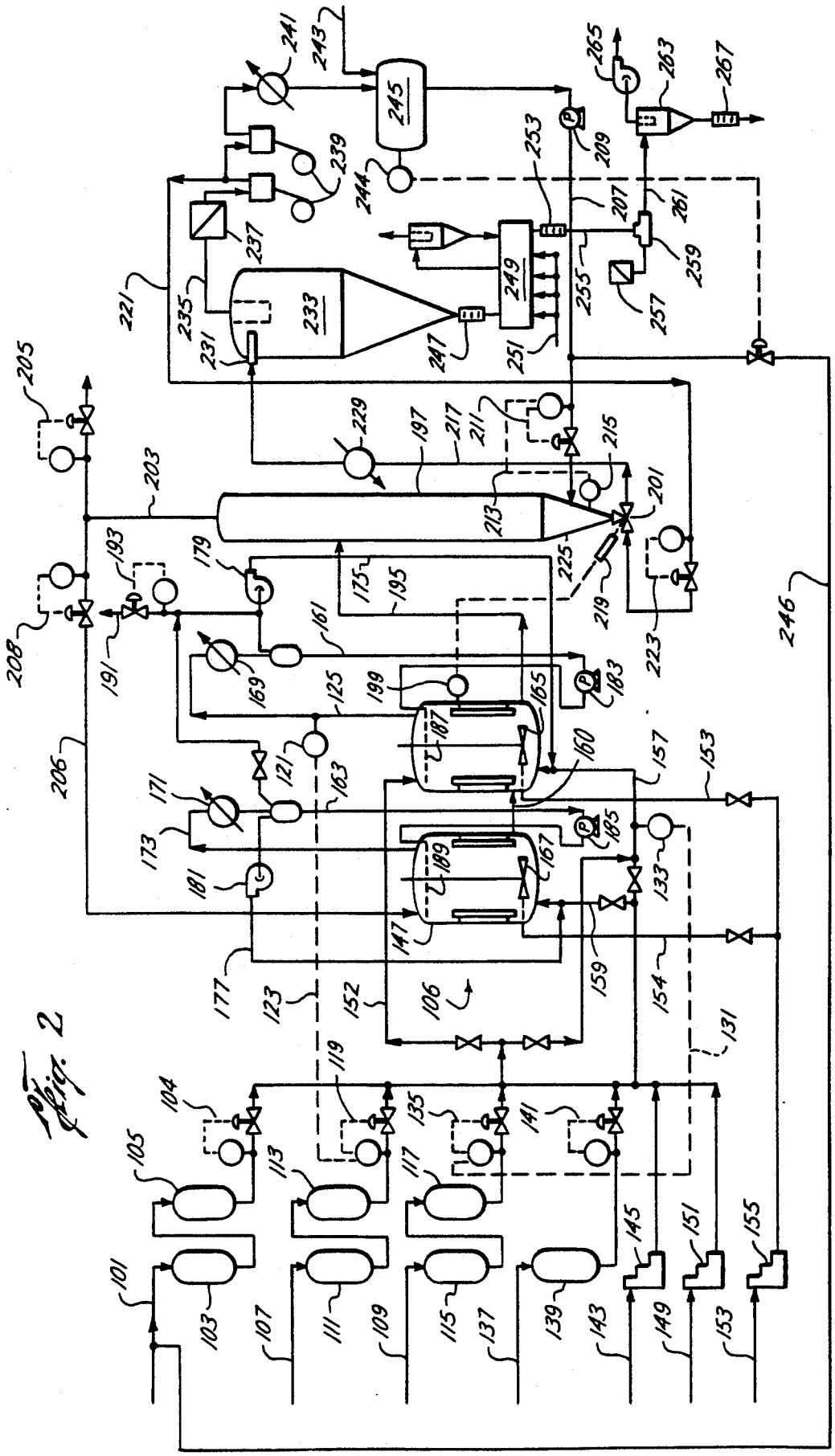
FIG. 2 is a schematic of the elastomer process of the preferred embodiment of the present invention.

Referring to FIG. 2, in feed preparation step 10, there are multiple streams. The diluent or solvent stream 101 flows sequentially through a set of purification columns 103, 105. Column 103 is packed with 3A molecular sieves which reduce moisture in the stream by adsorption to less than one part per million. Column 105 is packed with 13X molecular sieves which reduce oxygenated and acetylenic compounds in the stream by adsorption to less than one part per million. Compounds that may be adsorbed by the 13X sieves include any traces of alcohol, ketones, carbon monoxide, carbon dioxide, oxygen and acetylenic compounds. Reduction of these materials in the stream to near zero reduces catalyst requirements and, possibly, by-products which in turn improves post-reactor purification systems.

The adsorption columns 103, 105 are constructed of low carbon steel to pressure and temperature specifications in the range of 100 to 500 psig and 300° to 600° F. The columns 103, 105 are regenerated by a heat purging cycle, not shown, and are sized for optimum economic operation.

The preferred diluent 101 for most systems which produce rubber in particulate form in the reactor is isobutane except for (i) ethylenepropylene-diene rubber where the preferred diluent is propylene, one of the monomers, and (ii) butyl rubber where the preferred diluent is methyl chloride. Also, when cis-polybutadiene or cis-polyisoprene is produced as a solution in the reactor, the preferred solvent is cis-butene-2. Alternative diluents are propane, n-butane, and pentanes. Also, depending on the catalyst, propylene, butene-1, trans-butene-2 and pentene may be used as diluents.

The flow through columns 103, 105 to the reactor system 106 is controlled by a flow control loop 104 downstream from the column 105.

Monomer streams 107, 109 are also introduced to the reactor 106 for reaction step 20. These streams 107, 109 are as follows for the several products of this process:

|  | Stream 107 | Stream 109 |
| --- | --- | --- |
| Styrene-Butadiene Rubber | Butadiene | Styrene |
| Styrene-Butadiene Block Rubber | Butadiene | Styrene |
| Ethylene-Propylene-Diene Rubber | Ethylene | Ethylidene Norbornene |
| Cis-Polybutadiene Rubber | Butadiene | nil |
| Cis-Polyisoprene Rubber | Isoprene | nil |
| Epichlorohydrin Rubber | Epichlorohydrin | Ethylene oxide |

-continued

|  | Stream 107 | Stream 109 |
| --- | --- | --- |
| Butyl Rubber | Isobutylene | Isoprene |

Stream 107 is purified in columns 111, 113 connected in series, and stream 109 is purified in columns 115, 117 connected in series. Columns 111, 115 are packed with 3A molecular sieves which reduce moisture in these monomers by adsorption to less than one part per million. Columns 113, 117 are packed with 13X molecular sieves which reduce oxygenated and acetylenic compounds in these streams to less than one part per million.

The four adsorption columns 113, 115, 117, 119 are made of low carbon steel to pressure and temperature specification in the range of 100 to 500 psig and 300° to 600° F. depending on the products to be manufactured at the plant. The columns 113, 115, 117, 119 are regenerated by a heat purge cycle, not shown, and are sized for optimum economic operation.

The flow through columns 113, 115 is controlled by a flow control loop 119 that is reset or cascaded from an on-line process analyzer 121, by control loop 123. Analyzer 121 receives samples from the vapor line 125 between reactor 127 and vapor condenser 129. This system is satisfactory for volatile monomers such as butadiene, isoprene, ethylene and propylene. Alternatively, stream 107 feed control could be reset or cascaded by control loop 131 from the on-line analyzer 133 which is shown resetting or cascading the flow control loop 135 for stream 109 through columns 115, 117 to the reactor system 106.

Stream 137 is a hydrogen stream. This stream is dried in column 139. Column 139 is packed with 3A molecular sieve which reduce moisture in the hydrogen by adsorption to less than one part per million. Hydrogen flow through column 139 is controlled by a flow control loop 141. The flow rate is set on the basis of product molecular weight.

Alternatively, the on-line process analyzer 121 may be used to reset the flow control based on hydrogen in the reactor vapor 125. However, that relationship is a function of product molecular weight.

Stream 143 is the aluminum alkyl catalyst component that is used for ethylene-propylene-diene rubber, cis-polybutadiene rubber, cis-polyisoprene rubber, epichlorohydrin rubber and butyl rubber. Metering pump 145 is shown in FIG. 2 controlling the flow of this component to either reactor 127 or reactor 147 depending on the product. Alternatively, a separate pump may be used for each reactor. A stainless steel diaphram metering pump is normally used for this service.

Stream 149 is a modifier or mixture of modifiers to optimize catalyst effectiveness by moderating the catalyst component reactions or by preventing post reactions of the polymer. Metering pump 151 controls the flow of stream 149 to reactor 127 or 147 depending on the product. Alternatively, individual pumps may be used for each modifier and/or for each reactor. A stainless steel diaphram metering pump is normally used for this service.

Stream 153 is the key catalyst component, and flow is controlled by the stainless steel diaphram metering pump 155. this component varies depending on the product and may be a cobalt salt, a titanium salt, a vanadium salt or butyl lithium. A process using butyl lithium normally does not require aluminum alkyl components or modifiers.

Streams 101, 107, 109, 137, 143, 149 are shown in FIG. 2 being mixed in-line as stream 157 or stream 159 to the reactors 127, 147 respectively. These streams could alternatively enter the bottom of the reactors 127, 147 individually, however in this scheme a more uniformly mixed feed is obtained for entry into the reactors 127, 147. For the use of both reactors 127, 147, an alternate stream 152 is used to introduce a mixed in-line stream to reactor 127 directly.

The key catalyst component stream 153 must enter the reactor 127 (or a stream 154 entering reactor 147 if both reactors of the preferred embodiment are used) separately to prevent reaction before the reactor(s).

Reaction

Two reactors are shown in FIG. 2 since two or three reactors are necessary to produce block polymers such as the styrene-butadiene block rubber. A single reactor may be used to produce homopolymers and random copolymers, however for product quality flexibility, it may be desirable to operate two reactors in parallel or in series. It should be understood that the number of reactors is not a limitation for the invention.

FIG. 2 shows ebullient or reflux cooled reactors 127, 147 connected by gravity stream 160. Alternatively an auto-refrigeration system may be used to recycle condensable vapors. Also, alternatively a pipe loop or various other types of reactors may be used. The reactors 127, 147 should have a very high finish surface to minimize sticking of rubber particles to the reactor wall. Such a finish may be achieved by polishing stainless, electro-polishing and possibly coating the surface of polished carbon steel with electro-less nickel or a hard TEFLOW(polytetrafluoroethylene) surface. Also baffles should not protrude above the operating level in the reactor.

Each reflux stream, stream 161 for reactor 127 and stream 163 for reactor 147, is sprayed into the top of the respective reactor, all to minimize sticking of particles.

An axial turbine agitator, agitator 165 for reactor 127 and agitator 167 for reactor 147, is used to mix the reactants and suspend the product particles.

The pressure and temperature specifications for each reactor 127, 147 range from 150 to 500 psig and 300° to 550° F. depending on the product or products to be manufactured.

The vapor effluent from each reactor 127, 147 flows to a condenser, condenser 169 for reactor 127 and condenser 171 for reactor 147, via vapor streams 125, 173, respectively. In the condensers, the condensibles of the vapors are liquified. The non-condensible gases are recycled via a recycle stream, stream 175 for reactor 127 and stream 177 for reactor 147, by a blower, blower 179 for reactor 127 and blower 181 for reactor 147, to the bottom of each reactor, reactors 127, 147 respectively. The liquified materials, such as the liquid reflux from streams 161, 163 are pumped by a pump, pump 183 for reactor 127 and pump 185 for reactor 147, through a spray ring in each reactor, ring 187 for reactor 127 and ring 189 for reactor 147. A stream 191 is provided to vent a portion of the vapor recycycle stream 175 to disposal, not shown, automatically upon the rise of pressure on reactor 127 beyond a set point determined by a pressure control loop 193.

The simplest mode of operation is for the manufacture of homopolymers and random copolymers using only reactor 127. In this mode the combined stream 157 and the key catalyst component stream 153 flow into the reactor 127, and the rubber slurry discharges from the side of the reactor 127 as stream 195 to the wash column 197.

For block copolymer, the combined stream 159, with only one monomer and an alternate key catalyst component stream 154, flow into reactor 147. The second monomer stream 152 flows to the second reactor 127. Since the reactors 127, 147 are at the same pressure, reactor 147 discharges by gravity through stream 160 to reactor 127. Reactor 127 discharges via stream 195 to wash column 197 as before. In both modes the level control loop 199 provided on reactor 127 operates the discharge valve 201 on the bottom of the wash column 197 to maintain level in the reactors.

Product Separation From Reactor Effluent

The slurry from the reactor 127, stream 195, enters the countercurrent wash column 197 about one-half to two-thirds of the distance from the bottom of the column 197. The key design parameters of the settling column 197 are the ratio of liquid wash to liquid reactor effluent and the settling rate of the particles. The volumetric ratio of settling liquid to reactor effluent liquid must be greater than one to insure that the reactor effluent liquid discharges at the top of the column 197 as stream 203 under control by pressure control loop 205 goes to a purification section, not shown, and is ultimately partially recycled to stream 101 and partially recycled to column 197. The preferred ratio is 1.25 to 1.75. The column 197 diameter is designed such that the upward flow does not exceed the particle settling rate with a preferred range of 2 to 7 feet per second for most elastomers. The liquid stream 207 is pumped to the bottom of column 197 by pump 209. The flow is controlled by a flow control loop 211 which is reset or cascaded by control loop 213 from the density controller sensor, analyzer 215.

Alternatively, as shown in FIG. 2, a portion of stream 203 may be recycled via stream 206 directly to reactor 147 of the reaction step 20 under control of flow control loop 208 to conserve catalyst and energy.

The bottom of column 197 discharges the elastomer particles in fresh diluent as stream 217. For discharge from column 197, FIG. 2 shows an intermittently discharging three-way valve 201 operated by a open-closed position timer 219 that is actuated by the reactor 127 level control 199. A gaseous stream 221 is recycled, as discussed infra, to provide adequate velocity in stream 217.

FIG. 2 shows a cone bottom 225 for the column 197. A number of alternate discharge configurations may be possible or even necessary. Alternatively, the column 197 bottom section may be agitated or the column 197 mounted on an agitated vessel.

Also the three-way valve 201 shown may be replaced by a vane pump, a moyno pump, a continuously rotating plug, or perhaps even a simple control valve depending on the size of the flow and the characteristics of the slurry.

The surface of column 197 may be made of highly polished stainless steel or electro-less nickel coated carbon steel to minimize sticking of particles. The pressure and temperature specification depend on the product manufactured and diluent used but will usually range from 150 to 500 psig and 300° to 550° F., respectively.

As shown in FIG. 3, when the reactor effluent in stream 195 is a solution, the settling column 197 is bypassed. If catalyst removal is needed, FIG. 3 shows stream 195 flowing to a mixer 226 where small amounts of catalyst complexing agents from stream 228 via metering pump 230 are incorporated and reacted. The solution then flows to a pair of hydrocyclones 227, 227A, or centrifuge, to separate the denser catalyst complex. The clarified polymer solution is then discharged as stream 217 into the flash tube 229 under pressure control of valve 201 by pressure control loop 232, rather than level control loop 199.

Waste from cyclones 227, 227A is accumulated in waste tanks 232, 232A, respectively, and is fed to waste disposal (not shown) via stream 230 controlled by level controllers 234, 234A, respectively. In addition, no flow is permitted through control loop 211 and recycle from stream 207 all goes to stream 101 via stream 246.

The manufacture of liquid elastomer using another alternate configuration of FIG. 4 requires a different modification of the process. A diluent is selected which is not a solvent for the liquid polymer. The effluent of the reactor 127 flows via stream 195 to a decanter 224. In decanter 224, the liquid elastomer settles and is decharged from the bottom of decanter 224 to an agitated film evaporator 238 or a falling film dryer (not shown) via stream 248. The flow of fluid from decanter 224 is controlled by interface controller 240. The remainder of the fluid in decanter 224 is diluent and flows via stream 203 to purification. The vapor from film evaporator 238 flows to filter 237 via stream 235. The liquid from film evaporator 238 flows to storage (not shown) via stream 242. In addition, no flow is permitted through control loop 211 and recycle from stream 207 all goes to stream 101 via stream 246. Alternatively, the liquid elastomer could be discharged from the bottom of decanter 224 to the flash tube 229.

Diluent Purification

The purification system is not shown in FIG. 2 but would consist of a distillation system that removes low boiling and high boiling components and recycles via stream 243 the major center cut partly to the wash column via flow control 211 and the remainder to the beginning of the process as part of stream 101 via stream 246 under control of level control loop 244 which controls the level on vessel 245.

Product Separation

In either the configuration of FIG. 2 or FIG. 3, the diluent or solvent 217 is flashed at the discharge valve 201 by flash tube 229. Depending on the solids concentration, diluent and flash temperature, about one-half to two-thirds of the liquid is vaporized instantaneously. The flash tube 229 is a heat jacketed pipe connected between the valve 201 and flash tank 233. The pipe diameter is designed to provide a velocity of at least 3200 feet per minute (53 feet/sec) to convey the particles without sticking to the flash tank 233. The length of the flash tube 229 is designed to vaporize the remainder of the diluent and heat the elastomer to the required temperature by providing sufficient heat transfer surface and is a function of a pipe diameter, the desired rubber temperature and thus the amount of heat to be transferred. As shown in FIG. 2 and discussed supra, for the concentrated slurries of this invention, some additional gaseous diluent is recycled by stream 221 to achieve the necessary gas to solid ratio for dilute phase pneumatic conveying through the flash tube 229.

The gas and particulate rubber from the flash tube 229 enter the flash tank 233 through nozzle 231 where the gas and particulate are separated. The flash tank 233 is designed to provide efficient cyclonic separation.

Compression

The gas from tank 233 exits tank 233 via stream 235 and is filtered by filter 237 and compressed by compressors 239. Some of the gas is recycled from the first stage of compressors 239 via stream 221 for flash tube conveying. The majority of the gas is condensed after compression by condenser 241, collected, and mixed with additional diluent from purification stream 243 in vessel 245. The effluent from vessel 245 is pumped to column 197 as wash liquid stream 207 using pump 209, as discussed supra and excess is mixed with supply stream 101, via level controller 244.

The particulate rubber is discharged from the bottom of tank 233 via a double trap door type valve 247 to the fluid bed dryer 249.

The flash tank 233 is constructed of aluminum or stainless steel and polished to a high finish and may be coated with electroless nickel to minimize sticking of rubber particles. Flashing pressure is in the range of 1 to 10 psig, and temperatures depend on the required particle temperature to prevent agglomeration and other sticking of particles. This temperature may range from −50° to 50° F.

The remaining diluent gas and liquid, estimated at perhaps 2%, is removed in the fluid bed dryer 249, using closed loop nitrogen stream 251 as the fluidizing gas.

FIG. 2 does not show the carbon or molecular sieve adsorption system used to remove hydrocarbon from the nitrogen to maintain a reasonable concentration of hydrocarbon in the nitrogen gas, but this is well known in the art.

Product Finishing

The particulate rubber is discharged to the pneumatic conveying system from dryer 249 through the double trap door type valve 253 to stream 255 for pneumatic conveying product finishing step 80. The conveying medium for the pneumatic conveying system is air which enters the process through filter 257. The air picks up the rubber particles at the venturi injector 259, and transports the particles via stream 261 to the cyclonic separation-collector 263. The motive force for this system is provided by a blower 265. The particles are discharged from the collector 263 via a double trap door type valve 267, where it goes to a baler (not shown).

Parameters

The choice of a diluent or solvent is very important to this process. The diluent or solvent should have a relative low boiling point to allow complete vaporization from the elastomer at a temperature at which the elastomeric particles are not sticky. This temperature is controlled by a heated flash tube 229 ahead of the flash chamber 233 and of course the choice of diluent or solvent. Obviously, the diluent solubility characteristic relative to the polymer must be such as to produce particulation in the reactor. Thus the diluents or solvents are limited to $C_3$, $C_4$ and $C_5$ hydrocarbons and $C_1$ chlorinated hydrocarbon, in most cases, in these ionic catalyst polymerizations. Examples of such diluents are propylene in ethylene-propylene-diene and methyl chloride in butyl rubber polymerizations. This invention includes the use of cis-butene-2 and mixtures of cis butene-2 with trans-butene-2 or butene-1 and other $C_3$, $C_4$ and $C_5$ hydrocarbons as a solvent for cis polybutadiene, styrene-butadiene and cis-polyisoprene in application to the process of this invention. Further, this invention conceives the use of $C_3$, $C_4$ and $C_5$ hydrocarbons other than cis-butene-2 and cis internally unsaturated $C_5$ olefins as diluents for producing cis-polybutadiene, cis-polyisoprene and styrene-butadiene random and block copolymer in particulate form.

A very important factor in producing quality cis-polybutadiene, cis polyisoprene, styrene-butadiene and ethylene-propylene-diene elastomers in particulate form with the usual metal-organic catalysts is to add a modifier that minimizes or prevents cross-linking reactions. Such modifiers are well known as Lewis bases. Examples of the modifiers are ethers, tri alkyl amines and dialkyl sulfides.

Another important feature of this process is the use of electro-polishing or electro-less nickel or TEFLON (polytetrafluoroethylene) to coat the surfaces of critical equipment to minimize or prevent adhesion of elastomer. Equipment that may be coated in this manner includes the reactors 127, 147, the transfer lines, the settling column 197 and the flash tank or cyclone 233.

EXAMPLE 1

A solution of 70 wt. % butadiene-30 wt. % styrene mixture at 30% concentration in isobutane is passed through the 3A and 13X molecular sieves in sequence to eliminate dissolved water and acetylenic and other organic catalyst poisons. This stream and a n-butyl lithium stream are separately metered to an autoclave reactor. The reactor is equipped to remove the heat of polymerization by the method of evaporating, condensing and recycling condensate to the reactor. This method is commonly known as ebullient or reflux cooling. The conversion of butadiene and styrene to styrene-butadiene rubber gives a slurry of this rubber in isobutane. The size of the particles in the slurry is about 1/16" to ¼", depending on the degree and quality of agitation and the diluent composition. The reactor is equipped with a liquid level control that continuously discharges an increment of the slurry. The slurry passes to a settling column where the particles drop into fresh isobutane and the fluid from the reactor is discharged from the top of the column. The settling column thus separates the particles from the unreacted styrene and butadiene. The fluid from the top of the settling column may be partially recycled to the reactor to conserve styrene-butadiene and catalyst and the remainder is sent to a purification section. The slurry from the bottom of the settling column is discharged through a flash heater tube were almost all the isobutane is vaporized, separated from the particles in a flash tank, compressed, condensed, and recycled to the settling column. The temperature of flashing is controlled at a sufficiently low temperature to prevent stickiness of the rubber particles.

The rubber particles are discharged onto a closed-loop nitrogen gas fluid bed dryer which removes residual hydrocarbons. The rubber particle are pneumatically conveyed to a baling and packaging line.

EXAMPLE 2

The same process is used to manufacture styrene-butadiene-styrene and styrene-isoprene-styrene block copolymers except that three reactors in series are used. A 15 wt. % solution of styrene in propane is continuously fed through 3A and 13X molecular sieves sequentially into the first reactor along with a separate stream of n-butyl lithium in isobutane. Polystyrene particles are continuously formed and discharged from the first reactor to the second reactor. Butadiene is continuously fed to the second reactor and which continuously discharges to a third reactor (not shown). Styrene is continuously fed to the third reactor.

The last reactor discharges to a settling column where the particles are separated from the reactor fluid by dropping through the fresh up-flowing isobutane. The overhead fluid from the column is sent to a purification section. The block copolymer slurry is discharged through a flash heater tube to a flash tank. Almost all the hydrocarbon fluid is vaporized in the flash tube. The vapors from the flash tank are compressed, condensed and the condensate is recycled to the wash column.

The block polymer particles are discharged from the flash tank to a fluid bed dryer where the remainder of the hydrocarbon fluid is vaporized and separated. The dry thermoplastic block copolymer is discharged from the fluid bed dryer to a pneumatic conveying system and thence packaged.

EXAMPLE 3

The same process is used to manufacture ethylene-propylene-diene rubber. Propylene liquid is pumped through 3A and 13x molecular sieve in sequence. Propylene is the diluent for the process. Ethylene is passed through 3A and 13x molecular sieves and mixed in-line with the propylene. Diene monomer, catalyst modifier and the aluminum alkyl catalyst component are also mixed in the propylene stream enroute to the reactor. The vanadium catalyst component is metered separately to the reactor.

The reactor is equipped for reflux cooling. Reflux cooling may be accomplished as described in Example 1 or with the use of a compressor to provide auto-refrigeration and propylene recycle. Concentrations of polymer particles is normally 25 to 35%. The reactor discharges continuously by level control to a setting column where the rubber particles drop through the up-flowing fresh propylene. The overhead from the setting column may be partially recycled to the reactor to conserve catalyst and energy and the remainder is sent to a purification unit.

The slurry of rubber particles is discharged through a heated flash tube to a flash tank. The temperature of the rubber particles is controlled to prevent stickiness by the design and amount of heat supplied to the flash tube.

Essentially all of the propylene is vaporized in a flash tube, separated in the flash tank and compressed, condensed and the condensate is recycled to the setting column. The rubber particles are discharged to a fluid bed dryer which vaporizes and removes remaining hydrocarbon. The rubber particles are discharged continuously from the fluid bed dryer and pneumatically conveyed to the baling and packaging line.

EXAMPLE 4

Cis-polybutadiene rubber is manufactured by the same process. Butadiene, 30 wt. % in n-butane, is metered sequentially through 3A and 13X molecular sieves and mixed in line to the reactor with catalytic amounts of water modifier, a Lewis base modifier and aluminum alkyl catalyst component. A cobalt catalyst component is metered separately to the reactor.

The reactor(s) is equipped for reflux cooling using either direct condensation of the vaporized butane and butadiene or by an auto-refrigeration system. The cis polybutadiene rubber is a slurry in the diluent. The reactor continuously discharge the 30 wt. % slurry to the setting column where the rubber particles drop through up-flowing fresh n-butane. The diluent from the reactor thus is discharged from the top of the column. The fluid from the top of the column may be partially recycled to conserve catalyst and energy and the remainder is sent to purification.

The slurry from the bottom of the setting column is discharged continuously through a flash tube heater where essentially all the diluent is vaporized to a flash tank where the particles are separated. The vapor is compressed, condensed and recycled to the column. The rubber particles are discharged continuously to a fluid bed dryer where the remaining hydrocarbon is vaporized and removed. The dry cis-polybutadiene particles ranging from 1/6" to ¼ are discharged from the dryer and pneumatically conveyed to the baling and packaging line.

EXAMPLE 5

Cis polyisoprene is manufactured by the same process. Isoprene, 30 wt % in isobutane, is continuously metered sequentially through 3A and 13X molecular sieves and mixed in-line to the reactor(s) with aluminum alkyl catalyst component and a catalyst modifier. A titanium catalyst component is metered separately to the reactor.

The reactor(s) is equipped for reflux cooling using either direct condensation of the vaporized isobutane or an auto-refrigeration system. The cis-polyisoprene rubber is a slurry in the diluent. The reactor(s) continuously discharges the 30 Wt % slurry to the setting column where the rubber particles drop through the up-flowing fresh isobutane. The diluent from the reactor thus is discharged from the top of the column. This fluid from the top of the column may be partially recycled from the top of the column to the reactor to conserve catalyst and energy and the remainder is sent to the purification system.

The slurry from the bottom of the setting column is discharged continuously through the flash heater tube where essentially all the diluent is vaporized. Flashing temperature is controlled to prevent stickiness. The vapor is compressed, condensed and recycled to the settling column. The rubber particles are discharged to the fluid bed dryer where the remainder of the light hydrocarbons are vaporized and removed.

The dry, cis-polyisoprene rubber particles are discharged continuously from the fluid bed dryer and pneumatically conveyed to the baling and packaging line.

EXAMPLE 6

Epichlorohydrin homo and copolymer with ethylene oxide is manufactured by the same process. Epichlorohydrin or epichlorohydrin and ethylene oxide, 30 wt % in isobutane, are continuously metered sequentially through 3A and 13X molecular sieves and mixed in-line to the reactor(s) with a catalytic quantity of water. An aluminum alkyl catalyst component is metered separately to the reactor(s).

The reactor(s) is equipped either for direct condensing of vaporized isobutane or with an auto-refrigeration system. Epichlorin rubber is a slurry in the diluent. The reactor(s) continuously discharges a 30 Wt % slurry to the settling column where the rubber particles drop through the up-flowing fresh isobutane. The diluent from the reactor is thus discharged from the top of the settling column. This fluid may be partially recycled to the reactor to conserve catalyst and energy and the remainder is sent to the purification system.

The slurry from the bottom of the settling column is continuously discharged through the flash heater tube where essentially all the diluent is vaporized to the flash tank. Flashing temperature was controlled to prevent 'stickiness of the epichlorohydrin rubber particles. The vapor from the flash tank is compressed, condensed and recycled to the settling column. The rubber particles are dicharged to the fluid bed dryer where any remaining light hydrocarbon is vaporized and removed.

The dry, epichlorohydrin rubber particles are continuously discharged from the fluid bed dryer and pneumatically conveyed to the baling and packaging line.

EXAMPLE 7

Butyl rubber (97% isobutylene-3% isoprene) is manufactured by the same process. Isobutylene-isoprene, 30 Wt. % in methyl chloride, is continuously metered sequentially through 3A and 13X molecular sieves and mixed in line to the reactor(s) with catalytic quantities of water. Aluminum alkyl chloride catalyst component is metered separately to the reactor.

The reactor(s) are equipped with either direct condensation of vaporized methyl chloride or with an auto-refrigeration system. Butyl rubber is a slurry in methyl chloride. The reactor(s) continuously discharges the 30 Wt % slurry to the settling column where the particles drop through up-flowing fresh methyl chloride. The diluent from the reactor is thus discharged from the top of the settling column. This fluid may be partially recycled to conserve catalyst and energy and the remainder is sent to the purification system.

The slurry from the bottom of the settling column is continuously discharged through the flash heater where essentially all the diluent and light hydrocarbons vaporize to the flash tank. Flashing temperature is controlled to prevent stickiness of the rubber particles. The vapor from the flash tank is compressed, condensed and recycled to the settling column. The butyl rubber particles are discharged to the fluid bed dryer where any remaining methyl chloride and light hydrocarbons are vaporized and removed.

The dry butyl rubber particles were discharged continuously and pneumatically conveyed to the baling and packaging line.

EXAMPLE 8

Solution polymerized cis-polybutadiene is manufactured by a slight modification of this process. Butadiene, 15 Wt % in cis-butene-2, is continuously metered sequentially through 3A and 13X molecular sieves and mixed in-line to the reactor(s) with catalytic amounts of water, a modifier and an aluminum alkyl catalyst component. A cobalt catalyst component is metered separately to the reactor(s).

The reactor(s) is equipped for either direct condensation of cis-butene-2 and butadiene vapor or with an auto-refrigeration system. Cis-polybutadiene is a solution in cis-butene-2. The reactor(s) continuously discharge the 15% cis-polybutadiene solution through the flash heater tube to the flash tank without the use of column 197. The cis-polybutadiene solution is almost instantaneously converted to particles conveyed in cis-butene-2 and butadiene vapor in the flash tube. The flash tank separates the vapor and cis-polybutadiene particles. The vapor is compressed, condensed and sent to the purification system.

The rubber particles discharged to the fluid bed dryer where any remaining light hydrocarbons are vaporized and removed. The dry cis-polybutadiene particles are discharged continuously from the dryer and pneumatically conveyed to the baling and packaging line.

EXAMPLE 9

Solution polymerized cis-polyisoprene is manufactured by a slight modification of this process. Isoprene, 15 Wt% in cis-butene-2, is continuously metered sequentially through 3A and 13X molecular sieves and mixed in-line to the reactor(s) with a modifier and an aluminum alkyl catalyst component. A titanium catalyst component is metered separately to the reactor(s).

The reactor(s) is equipped either for direct condensation of the cis-butene-2 and isoprene vapor or with an auto-refrigeration system. Cis-polyisoprene is a solution in cis-butene-2.

The reactor discharges continuously to an in-line mixer where it is mixed with a small amount of a catalyst complexing agent and then to a hydrocyclone or centrifuge to separate the complexed catalyst.

The clarified cis-polyisoprene solution is then flashed in the heated flash tube where it is essentially instantaneously converted to cis-polysioprene particles in cis-butene-2 vapor. The flash temperature is controlled to prevent stickiness. The gas and rubber particles are separated in the flash tank. The vapors are compressed, condensed and sent to the purification system.

The rubber particles from the flash tank are continuously discharged to the fluid bed dryer where any remaining light hydrocarbons are vaporized and removed. The cis-polyisoprene rubber particles are continuously discharged from the dryer and pnuematically conveyed to the baling and packaging line.

It is to be understood that the process of this invention is not limited to the specific pieces of equipment described above.

For example, batch operation would be sequential rather than continual running of the reactors with the reactors charging from the feed streams and discharging through the column and flash tube. Accordingly, although the system described in detail above is most satisfactory and preferred, many variations in structure and method are possible, such as changes in vessels, valves and materials of construction described supra.

Because many varying and different embodiments may be made within the scope of the inventive concept herein taught, and because modifications may be made in accordance with the descriptive requirements of the law, it should be understood that the details herein are to be interpreted as illustrative and not in a limiting sense.

What is claimed as invention is:

1. A process for the manufacture of rubber, consisting of:
   A. feeding catalyst, a set of purified monomers taken from the following table and diluents to a reaction system

| Rubber | Monomer | Monomer |
   | --- | --- | --- |
   | Ethylene-Propylene-Diene | Ethylene | Ethylidene Norbornene propylene |
   | Epichlorohydrin | Epichlorohydrin | Ethylene oxide |
   | Butyl | Isobutylene | Isoprene | with a diluent selected from $C_3$, $C_4$ and $C_5$ hydrocarbons and $C_1$ chlorinated hydrocarbons or a mixture of these;
   B. reacting the set of monomers, diluents and catalysts in the reactor system to form a particulate rubber product set out in said table;
   C. receiving the product in a purification system
   D. purifying the product in the purification system from the remaining reaction components by settling the product in fresh diluent;
   E. separating the product from the diluent by flash evaporating at a pressure in the range of 1–10 psig the diluent from the product in the absence of water and steam; and
   F. finish drying the product in a dryer;
   whereby the group consisting of ethylene-propylene-diene rubber, butyl rubber and epichlorohydrin rubber are all produced by substantially the same equipment.

2. The process of claim 1, wherein there is included a Lewis base; and the effluent of Step B includes particulate rubber product and the diluent.

3. The process of claim 2, wherein the Lewis base is selected from the group consisting of ethers, tri-alkylamines and disulfides.

4. The process of claim 1, where there is included the step of purifying the monomer and diluent in route to the reactor system by 3A and 13X molecular sieves in series to remove traces of impurities prior to Step B.

5. The process of claim 1, wherein the flash portion of Step E occurs in a pipeline from the purification system to a flash chamber and the particulate rubber product is separated from the surrounding vaporized low boiling hydrocarbon diluents in the flash chamber.

6. The process of claim 1, wherein said Step B occurs in at least one reactor, said Steps C and D occur in a settling column, said Step E occurs in a pipe and a flash chamber, and the reactor, settling column and flash chamber are electropolished or coated with electroless nickel.

7. The process of claim 6, wherein Step E includes supplying heat to the diluent vapor and rubber particles in a heated flash tube, the heated flash tube being located between the settling column and the flash chamber.

8. The process of claim 7, wherein Step E includes separation in the flash chamber to separate the rubber particles from the vaporized diluent in the absence of water and steam and Step F further includes further evaporation of diluent on a fluid bed dryer in the absence of water and steam.

9. The process of claim 6, wherein Step E includes the step of controlling the temperature of the rubber in the flash chamber in part by the selection of diluent(s).

10. The process of claim 1, wherein the purification system includes a settling column and the product includes diluent(s), and the particulate rubber product is transferred from the diluent which contains catalyst to a purified diluent by settling through fresh quantities of purified diluent.

11. The process for the manufacture of rubber of claim 1 wherein the diluent is taken from the following table:

| Rubber | Diluent |
|---|---|
| Ethylene-Propylene-Diene | Propylene |
| Epichlorhydrin | Isobutane |
| Butyl | Methyl Chloride |

12. A process for the manufacture of rubber, comprising:

A. feeding substantially only a set of monomers and diluents taken from the following table and catalysts to a reaction system

| Rubber | Monomer | Monomer | Purified Diluent |
|---|---|---|---|
| Ethylene-Propylene-Diene | Ethylene | Ethylidene Norbornene, propylene | Propylene |
| Epichlorohydrin | Epichlorohydrin | Ethylene oxide | Isobutane |
| Butyl | Isobutylene | Isoprene | Methylchloride; |

B. reacting the set of monomers, diluents set out in said table and catalysts in the reactor system to form a particulate rubber product;

C. receiving the product of the reaction in a purification system;

D. purifying the rubber product in the purification system from the remaining reaction components by settling the rubber product into fresh diluent;

E. separating the rubber product from the fresh diluent by flash evaporating at a pressure in the range of 1–10 psig the diluent from the rubber product in the absence of water and steam followed by separation of the rubber product from the diluent vapor in a flash chamber; and F. finish drying the rubber product in a dryer;

whereby the group consisting of ethylene-propylene-diene rubber, butyl rubber and epichlorohydrin rubber are all produced by substantially the same equipment.

* * * * *